United States Patent [19]
Azrak et al.

[11] 3,928,278
[45] Dec. 23, 1975

[54] COUPLING AGENTS FOR CHRYSOTILE ASBESTOS AND THERMOPLASTIC POLYMERS

[75] Inventors: Raymond George Azrak, Whitehouse Station; Fred Harpoth Ancker, Warren Township; Michael Dean Bertolucci, Martinsville, all of N.J.

[73] Assignee: Union Carbide Corporation, New York, N.Y.

[22] Filed: Nov. 29, 1973

[21] Appl. No.: 420,232

[52] U.S. Cl.. 260/40 R; 117/126 AB; 117/126 AQ; 117/161 L; 260/37 N; 260/37 EP; 260/37 PC; 260/37 R; 260/42.14
[51] Int. Cl.² .................... C03C 25/02; C08K 3/34
[58] Field of Search...... 260/38, 37 PC, 37 N, 40 R, 260/42.14, 37 R, 37 EP; 117/126 AB, 126 AQ, 161 L

[56] References Cited
UNITED STATES PATENTS 2,653,886  9/1953  Gentle et al.................... 117/161 L
3,003,990  10/1961  Umland et al....................... 260/38
3,039,894  6/1962  Raphael et al. .............. 117/126 AB
3,519,593  7/1970  Balger............................. 260/42.14
3,519,594  7/1970  Michaels.......................... 260/42.47

FOREIGN PATENTS OR APPLICATIONS 1,287,166  8/1972  United Kingdom

*Primary Examiner*—Donald E. Czaja
*Assistant Examiner*—S. M. Person
*Attorney, Agent, or Firm*—John S. Piscitello

[57] ABSTRACT

There is disclosed a novel class of coupling agents for chrysotile asbestos and thermoplastic polymers. The coupling agents comprise certain phenolic materials, and their use as coupling agents in chrysotile asbestos-reinforced thermoplastic polymers serves to impart, at relatively low cost, a unique and valuable combination of properties to the said reinforced polymers. Preferred coupling agents are illustrated by 2,6-dimethylol-4-alkylphenols and oligomers and polymers thereof.

17 Claims, 1 Drawing Figure

IDEALIZED SCHEMATIC OF
POSSIBLE PHENOLIC/CHRYSOTILE SURFACE INTERACTIONS
A) Monomer interactions with 2,6-dihydroxymethyl-4-t-butylphenol
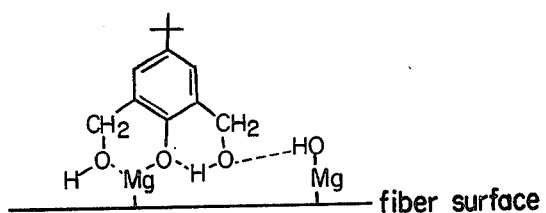
B) Methylene ether bridged resole of 4-t-butylphenol
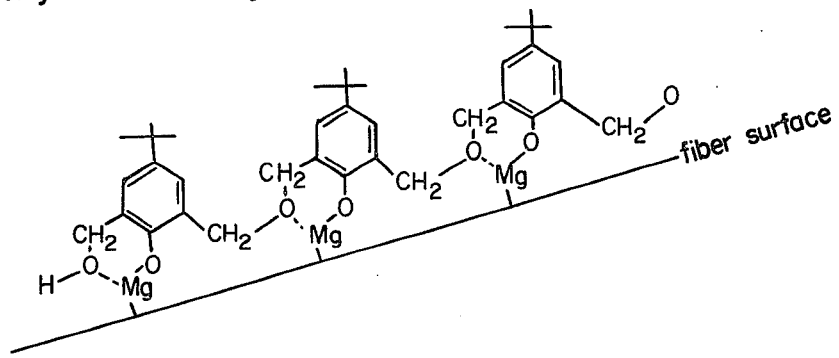
C) Methylene bridged novolak of 4-t-butylphenol
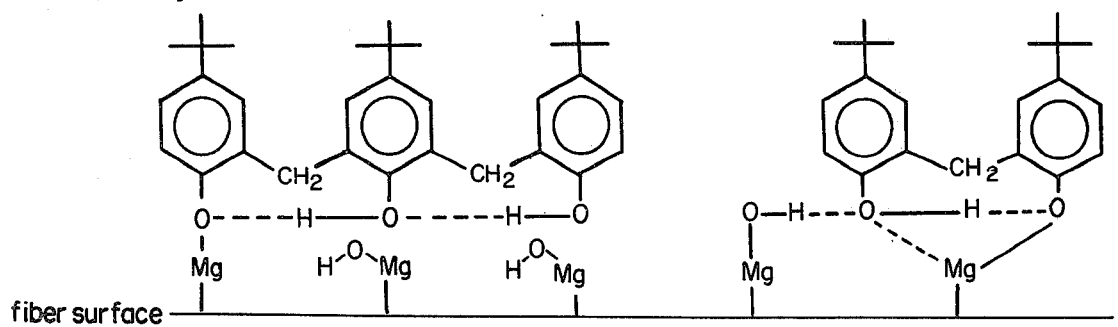

COUPLING AGENTS FOR CHRYSOTILE ASBESTOS AND THERMOPLASTIC POLYMERS

The invention relates to coupling agents for chrysotile asbestos and thermoplastic polymers, and to chrysotile asbestos-reinforced thermoplastic polymers that utilize said coupling agents.

Particulate and fibrous fillers have been used in polymeric materials for many years either as "insert" fillers to reduce cost and increase stiffness, or as "reinforcing fillers to improve other physical properties in addition to increasing the stiffness of the polymeric material. Generally stated, non-reinforcing or inert fillers do not increase and often even reduce strength properties such as the tensile and the flexural strength. Therefore, they reduce the fracture energy, i.e., the energy required to fracture the material as measured, for example, by the area under the stress-strain curve in a tensile or flexural strength test. Thus, while inert fillers increase the stiffness property of a polymer, the concurrent reduction in strength properties make such materials weak and brittle. In contrast, reinforcing fillers are distinguished by their ability to increase other physical properties in addition to the stiffness, notably the strength properties, resulting in highly desirable combinations of properties often unattainable in pure or non-reinforced polymers. In addition to material cost, it is always combinations of properties which determine the commercial utility of a practical material.

Chrysotile asbestos is widely used in many polymers as an inert filler (e.g., in vinyl floor tile) and in some instances as a reinforcing filler. However, the high reinforcing potential of chrysotile, which is indicated by the fibrous nature of this naturally occurring serpentine mineral and by the high modulus and tensile strength of natural chrysotile fiber bundles, has generally not been realized in commercial plastic products. The performance of chrysotile asbestos in thermoplastic polymers has been particularly disappointing. Hence, even though the modulus of chrysotile is more than twice that of fiberglass, and even though the tensile strength is at least comparable, chrysotile-containing thermoplastic polymers are usually markedly inferior in physical properties to their fiberglass reinforced counterpart materials. On top of that, addition of chrysotile asbestos to thermally and oxidatively labile polymers, such as polypropylene and polyvinyl chloride, reduces the thermal stability of such polymers during processing and during heat aging to unacceptably low levels.

These problems are well recognized in the art, and it is generally recognized that one of the major reasons for the low reinforcement efficiency of chrysotile is poor wetting and adhesion between the fibers and most thermoplastic resins, especially the polyolefins. Many attemps have, therefore, been made to improve the interfacial wetting and adhesion. However, these attempts have not been very successful — either because of uneconomically high costs of the processes so far necessary to achieve such improvements, or because the approaches solved only some of the problems and the resulting polymer composites, therefore, did not possess the combination of properties required for broad commerical utility.

For example, Belgian Pat. Nos. 758,438 and 786,245 prescribe a series of complex and expensive process steps whereby the surface of chrysotile asbestos first is changed from its natural magnesium hydroxide from (Brucite) to a silica type surface, which then is modified with a suitable silane coupling agent such as those commonly used to improve the polymer/fiber adhesion of fiberglass reinforced polymers. Another example of an involved and expensive approach is given in U.S. Pat. Nos. 3,519,593 and 3,519,594, which prescribe procedures for coating the chrysotile asbestos by polymerizing a monomer directly onto chrysotile fibers previously dispersed in an aqueous or non-aqueous solvent. Such approaches defeat the purpose of enhancing the reinforcing efficiency of a low cost natural product such as chrysotile asbestos by increasing its cost until it is scarcely competitive with other reinforcements such as fiberglass.

On the other hand, less expensive approaches have so far solved only part of the problem. A number of materials have been used as additives to improve chrysotile/polymer adhesion and/or thermal stability in particular polymer systems. For example, Canadian Pat. No. 762,479 and U.S. Pat. No. 3,654,202 describe the treatment of chrysotile asbestos with unsaturated fatty acid salts or alkenoic acids. Modest improvements in strength and stiffness (both tensile and flexural) are obtained in polyethylene resins, as the surface active agents are capable of reacting chemically with both the hydroxide ion of the chrysotile surface and with the resin. As is typical with additives of this nature, however, the limited improvements realized in composite strengths are rarely compensatory for the increased handling cost, and complementary physical improvements such as in high temperature creep, heat distortion, or thermal stability are lacking. This behavior is clearly shown in Belgian Pat. No. 727,539, which provides for the incorporation of polyamides such as nylon 6/6 into polyolefin/chrysotile blends. Some increases in breaking strength and no improvement in G moduli were found for polypropylene/(polyamide) chrysotile blends. Similarly, Japanese Pat. No. 71-7172-R describes the surface treatment of chrysotile with thermosetting and catalytic setting crosslinked resins for improved thermal stability and improved retention of mechanical properties after water exposure of filled polyolefin molding materials. Again though the additives are inexpensive and their incorporation is moderately facile, important physical properties as mentioned above are either unaffected or reduced in comparison with the unmodified chrysotile/polymer blends.

It has been recognized that the problem of reduced thermal stability in polypropylene/chrysotile blends seriously limits its use, and accounts for the fact that most asbestos filled polypropylene composites on the market today contain anthophyllite asbestos. The presence of this amphibole mineral does not increase the oxidative instability of polypropylene to the same extent as chrysotile. Anthophyllite is a poor reinforcement in comparison to chrysotile. Accordingly, British Pat. No. 1,287,166 and Belgian Pat. No. 722,183 prescribe specific and elaborate antioxidant formulations for moderate improvements in the thermal stability of chrysotile-filled polypropylene composites. These additives are generally quite expensive in comparison to the resin and reinforcement. Any procedure which would enable a reduction in the required concentrations of antioxidant for adequate stability is therefore highly desirable. This must not be done, however, at the expense of other physical properties which make the material useful, for instance, in load bearing applications. Thus, reductions in the chrysotile concentration or modification of the chrysotile with additives which reduce and/or only modestly increase some physical properties, are insufficient adjustments in competition with reinforcements which do not aggravate oxidative degradation of the resin and have high reinforcement efficiencies (e.g., glass fibers).

For example, interfacial additives for chrysotile reported useful for increased thermal stability and mechanical strength in polypropylene have been described in the Society of Plastics Industries Proceedings 28th Annual Technical Conference Section 11-C, pp 11–16, Feb. (1973). These systems, which typify the current state of the art in chrysotile surface treatments, still require considerable quantities of special antioxidants. In addition, and as will be shown below, these additives do not confer resistance to the effects of water. This is in contrast to the effect of silane coupling agents in glass-reinforced composites where the silane treatment has the effect of greatly improving the retention of mechanical properties after water exposure.

It has been our own experience with numerous interfacial additives for chrysotile — such as various substituted amines — that many economical additives which confer significantly improved fiber/polymer wetting and adhesion are water sensitive. Thus it was found that interfacial additives of this nature were solubilized or variously disrupted such that serious reductions in physical properties of the composites resulted upon exposure to aqueous environmental conditions.

The most significant constraints in selecting suitable interfacial modifiers for fibrous chrysotile are: First, they must be economical. Owing to the high specific surface area of reinforcing grades of chrysotile, typically 50 square meters per gram, large amounts of material are required for adequate surface coverage. This factor is considerably more important, therefore, than is the case with the silane coupling agents for glass reinforcement owing to the low surface area of fiberglass. Second, they must impart to the composites thermal stability and combinations of improved physical properties, including wet strengths, as demonstrated by competitive silane-treated glass-reinforced systems. To successfully compete with glass reinforcement, full advantage of the economic edge enjoyed by serpentine fibers over glass must be taken, and comparable or superior properties must be obtained in similar polymers. These constraints have not been overcome by any interfacial additive for chrysotile in thermoplastic polymers to date, with the exception of the present invention.

In brief summary, the objectives of the invention include one or more of the following:

To improve the mechanical properties of thermoplastic polymer/chrysotile blends;

To improve the thermal and/or oxidative stability of thermoplastic polymer/chrysotile blends;

To improve the retention of properties of thermoplastic polymer/chrysotile blends after exposure to water, especially at elevated temperatures; and To achieve the foregoing objectives at low cost so that the potential economic advantages of the inexpensive chrysotile asbestos are realized to a significant degree.

Towards the objectives described above, a novel class of phenolic interfacial coupling agents for chrysotile has been discovered. These agents, which are defined in detail below, show the unique combination of: effectiveness as wetting agents and adhesion promoters for chrysotile in thermoplastic polymers, low cost, and convenient availability in a form uniquely suitable for incorporation into high purity chrysotile. Utilization of these agents in thermoplastic/chrysotile blends dramatically increases aqueous environmental stability (particularly at elevated temperatures), reduces mold shrinkage, reduces the coefficient of thermal expansion, increases the heat distortion temperature, reduces the rate of creep at elevated temperature, increases the thermal stability of oxidatively unstable polyolefins, and increases the tensile and flexural strengths and stiffness. This superior and hitherto unattainable combination of values shown by these phenolic coupling agents and chrysotile filled composites containing same is fundamental to this invention.

The foregoing objectives are accomplished by the provision of a composition comprising a thermoplastic polymer reinforced with chrysotile asbestos filler, which composition contains sufficient first phenolic composition at the interface of said filler and said thermoplastic polymer to increase the tensile strength of an article molded from said reinforced polymer, wherein said first phenolic composition is the product obtained by heating a second phenolic composition.

Said second phenolic composition includes the following:

a. a first phenol having at least one ortho-hydroxymethyl group and, preferably, an oleophilic substituent in the para position;

b. a resole derived from a phenol having an oleophilic substituent in the para position;

c. a first novolak having the methylene bridges between phenolic nuclei at least predominantly bonded to the positions ortho to the phenolic hydroxyls;

d. a second novolak derived from a phenol having an oleophilic substituent in the para position, said second novolak being employed in combination with a reactive material capable of reacting with said second novolak to effect linear advancement thereof;

e. a second phenol having at least one unsubstituted position ortho to the phenolic hydroxyl, and having an oleophilic substituent in the para position, said second phenol being employed in combination with a reactive material capable of reacting with said second phenol to effect linear advancement thereof.

Three general methods of applying the phenolic coupling agents of the invention to chrysotile/polymer blends are suitable. This indicates the unique versatility of these agents in comparison to the prior art. They include various pretreatments of the chrysotile such as dry blending or adsorption from aqueous solution or organic solvent, and polymer modification such as dry blending the agents with the resin, or polymer pretreatment by solution deposition of the agents on the resin and volatilization of the solvent. Also effective is addition of the phenolic additives into the fluxed resin during compounding with the chrysotile. The latter two methods, which yield composite properties comparable to the former, illustrate still another property of these agents; that being a propensity to rapidly diffuse to and interact with the resin/chrysotile interface, and to do so in preference to similar compositions such as the hindered phenol antioxidants. Specific phenolic coupling agents that can be employed in the invention include those compositions that are represented by the generalized formula:

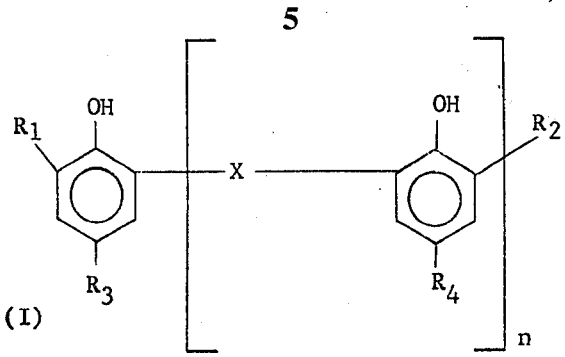

(I)

wherein n represents a number having an average value of from zero up to about ten. When n is zero, the phenolic composition must be capable of linear advancement, either by itself or by reaction with another composition. As limited by this proviso, when n is zero, $R_1$ is hydrogen, hydroxymethyl, aminomethyl ($CH_2NH_2$,) N-methylaminomethyl, carbonyloxyalkyl, carbonyloxyaryl, or alkyl, $R_2$ is as defined for $R_1$, and $R_3$ is an oleophilic group (i.e., an organic substituent group having some affinity for the thermoplastic polymer that is employed in the invention) such as alkyl, aryl, alkaryl, aralkyl, alkenyl, cycloalkyl, cycloalkenyl, any of the foregoing substituted with halo (chloro, bromo, iodo), halo, trifluoromethyl, carbonyloxyalkyl, carbonyloxyaryl, hydroxyarylalkyl, hydroxyarylthio, or hydroxyarylsulfone. The aforementioned capability of linear advancement includes at least one of $R_1$ or $R_2$ being hydroxymethyl, or at least one of $R_1$ or $R_2$ being hydrogen, aminomethyl, N-methylaminomethyl, carbonyloxyalkyl, or carbonyloxyaryl, with an additional reactive material being present, for example, hexamethylenetetramine, a resole (having a para-positioned oleophilic substituent), a composition represented by Formula I wherein n is zero and both $R_1$ and $R_2$ are hydroxymethyl, an aldehyde or aldehyde-engendering compound capable of undergoing phenol-aldehyde condensation (such as formaldehyde, paraform, acetaldehyde, acrolein, crotonaldehyde, furfural, and trioxane), a ketone (such as acetone), urea, thiourea, methylolurea, dimethylolurea, or hydrogen sulfide.

When n is 1 or more, $R_1$ and $R_2$ individually are as defined above (without, however, being limited by the said proviso), $R_3$ is hydrogen or as defined above, $R_4$ is hydrogen or as defined above for $R_3$, and X is methylene, methyleneoxymethylene, methyleneaminomethylene (i.e., the bridging group formed during the reaction of a phenolic material with hexamethylenetetramine), methyleneureylenemethylene (i.e., the bridging group formed by reaction of urea with a hydroxymethylphenol), methylenethioureylenemethylene (i.e., the bridging group formed by reaction of thiourea with a hydroxymethylphenol), methylenethiomethylene (i.e., the bridging group formed by reaction of hydrogen sulfide with a hydroxymethylphenol), or methylenesulfonylmethylene (the oxidation product of the corresponding thio material), provided that when n is 1 or more, the phenolic coupling agent is employed in such a manner that significant amounts of cross-linking are avoided. When n is zero, preferred $R_1$ and $R_2$ groups are hydroxymethyl and hydrogen (provided that only one of $R_1$ and $R_2$ is hydrogen), and preferred $R_3$ groups are alkyl, aryl, alkaryl, and aralkyl. When n is one or more, preferred $R_1$ and $R_2$ groups are hydroxymethyl and hydrogen, preferred $R_3$ and $R_4$ groups are alkyl, aryl, aralkyl, alkaryl, and hydroxyaralkyl, and preferred X groups are methylene, methyleneoxymethylene and methyleneaminnomethylene.

More specific preferred classes of coupling agents include the following:

a. para-substituted phenols having at least one ortho hydroxymethyl group;

b. para-substituted resoles; and c. novolaks such as bis(2-hydroxyphenyl)methanes and 2,2-bis(2-hydroxyphenyl)propanes having oleophilic substituents para to the phenolic hydroxyls, or para-substituted novolaks, either per se or combined with a means for advancement, such as hexamethylenetetramine, aldehyde or aldehydeengendering species, or para-substituted resole, or para-substituted-2,6dihydroxymethylphenols. There also can be used novolaks that do not have para-substituents, provided that the methylene bridges between phenolic nuclei are at least predominantly bonded to the positions ortho to the phenolic hydroxyls. The nature and production of such novolaks are well known to the art (such novolaks are produced, for example, when phenol and formaldehyde are reacted in the presence of zinc or lead acetate). Of course, since such novolaks have the capability of cross-linking with materials such as hexamethylenetetramine, they are used in the invention in the absence of such cross-linking agents.

Specific illustrative compositions that can be employed as phenolic coupling agents in the invention, either individually or in combination, include, by way of illustration:

2,6-dihydroxymethyl-4-t-butylphenol;
2,6-dihydroxymethyl-4-phenylphenol;
2-hydroxymethyl-4-decylphenol;
2-aminomethyl-4-dodecylphenol;
2-(N-methylaminomethyl)-4-pentylphenol;
2-(ethoxycarbonyl)-4-t-butylphenol;
2-(phenoxycarbonyl)-4-isopropylphenol;
2-hydroxymethyl-4-vinylphenol;
2,6-dihydroxymethyl-4-dodecenylphenol;
2,6-dihydroxymethyl-4-octadecylphenol;
2-hydroxymethyl-4-cyclohexylphenol;
2-hydroxymethyl-4-tolylphenol;
2,6-dihydroxymethyl-4-chloromethylphenol;
2,6-dihydroxymethyl-4-bromophenol;
2-hydroxymethyl-4-chlorophenol;
bis(2-hydroxy-5-methylphenyl)methane;
2,2bis(2-hydroxy-5-methylphenyl)propane;
novolak prepared from formaldehyde and 2,2-bis(4-hydroxyphenyl)propane;
novolaks and resoles prepared from para-substituted phenols and aldehydes, as for example, the novolaks and resoles prepared from para-t-butylphenol, para-cresol, para-misopropylphenol, para-dodecylphenol, para-phenylphenol, para-chlorophenol, and the like, using formaldehyde, acetaldehyde, furfural, and the like;
reaction products of the same para-substituted-phenols with hexamethylenetetramine or with 2,6-dihydroxymethyl-4-alkylphenols; reaction products of the same para-substituted-phenols with methylolurea; and the like. The Examples, below, further illustrate specific phenolic coupling agents that can be used in the invention.

The foregoing discussion of specific phenolic coupling agents and classes of such agents within the scope of Formula I, pertains to the phenolic compositions that are added to either the polymer, to the asbestos, or to both the polymer and asbestos in an integral blend. During processing of the polymer/asbestos blend, the phenolic material as represented by Formula I may linearly advance, as taught herein in a manner known to the art, as a result of the elevated temperatures reached by the blend during processing. Thus, the phenolic coupling agent in the final asbestos-reinforced composition of the invention may be a heat-advanced material derived from the material of Formula I. This is understood by the worker in the art, as is the nature of such heat-advanced phenolic composition. Employing the terminology used in the claims, the first phenolic composition may be the same as the second phenolic composition (if it does not react to linearly advance during processing), or the first phenolic composition may be the linearly advanced product of the second phenolic composition.

The coupling agents can be incorporated in chrysotile/polymer mixtures in a variety of ways. For instance, the coupling agent can be coated on the asbestos from aqueous or organic solution or suspension prior to mixing the asbestos and polymer; the asbestos, polymer, and coupling agent can be intermixed all in one operation; and the coupling agent can be mixed with the polymer prior to mixing with the asbestos.

Especially preferred methods of application of the coupling agents are: Mix-mulling an aqueous solution or suspension of the coupling agent such as 2,6-dihydroxymethyl-4-t-butylphenol into a mixture of chrysotile and water containing approximately 50 per cent by weight chrysotile, pelletizing and air drying the mixture at elevated temperatures. This method is particularly advantageous with the monomeric and low molecular weight additives which are readily solubilized, dispersed, or suspended in aqueous media; and Integral blend addition of the coupling agents during hot compounding of the chrysotile/polymer mixture. This method is particularly favored with the higher molecular weight oligomers and polymers of the phenolic agents.

The phenolic coupling agents are employed in amounts sufficient to improve the properties of the chrysotile/polymer blends. While small amounts, e.g., as little as about 1 weight per cent, based on asbestos weight, will improve some properties such as tensile strength, in order to achieve maximum potential benefit of the coupling agent's ability to provide stabilization as well as improve strength, the asbestos should be coated with a mono-layer of the phenolic material. It has been found that approximately 8 weight per cent, based on weight of asbestos, of the phenolic coupling agent is sufficient to provide a mono-layer coating of phenolic on substantially all of the asbestos. It is desirable to employ a slight excess over that amount in order to insure essentially complete coating of the asbesots. Accordingly, about 8–10 weight per cent, based on asbestos weight, of the phenolic coupling agent is usually employed. No benefit is found in employing more than the indicated amount, and if large excesses are used, some undesired plasticization of the thermoplastic polymer may occur.

From the above, it is clear that the compounds of the invention are distinguishable from the broad class of phenolic, phenolic-modified alkyd, epoxy, polyester and other thermosetting resins that are chemically similar. In thermosetting resins, two inter-related and important properties of the monomers or prepolymers are their ability to polymerize in three dimensions (i.e., crosslink) and subsequently advance to high molecular weight brittle and insoluble resins. It is furthermore this structural ability to crosslink which conveys to thermosetting resins and catalytic setting resins their unique combination of physical and chemical properties. In contrast, a significant structural feature of the phenolic coupling agents described here is that they possess essentially only two degrees of freedom, and as such essentially do not crosslink under the conditions taught in this invention. Thus, thermal advancement through bridging groups ortho to the phenolic hydroxyl group produces substantially linearly advanced oligomers and polymers. Cross-linking by advancement at the para position is prevented either by unreactive para substituents, or by making sure that novolaks having unsubstituted para positions are used in the absence of materials such as hexamethylenetetramine which could cause cross-linking. Significantly greater diffusion coefficients and solubilities for monomeric phenols and low molecular weight linear phenolic polymers are expected over highly crosslinked thermosetting resins or prepolymers. Hence, increased latitudes in the utilization of the interfacial agents in contrast to crosslinkable reactants are available.

Distinction between compounds of this invention and hindered phenol antioxidants, as described in Geigy Chemical Corp. product data sheet on "Irganox 1076" and in U.S. Pat. No. 3,365,406 and British Pat. No. 758,973, is also important. The term "hindered phenol" is traditionally applied to phenols with unreactive (in the Lewis sense) and preferably sterically hindering groups adjacent (i.e., ortho) to the phenolic hydroxyl function. For example, 2,6-ditertiary-butyl-4-methylphenol and bis(2-methyl-4-hydroxy-5-t-butylphenyl)methane, are common commercial hindered phenol antioxidants useful in polyolefins. Tertiary butyl groups are particularly effective in this context and appear in one or both of the ortho positions in the greater majority of all phenolic antioxidants. In the present invention, however, sterically hindering and chemically unreactive groups in positions ortho to the phenolic hydroxyl group are detrimental to the coupling agent's ability to perform in the manner of this invention. Furthermore, it is clear that the antioxidative properties shown by the coupling agents in composites containing chrysotile asbestos are attributable to their affinity for and coverage of the cationic (Brucite) surface. The coupling agents in resin/chrysotile blends are, therefore, not acting primarily as free radical traps in the resin, as do the "hindered phenols," as discussed by Cincinnati Milacron Chemicals Inc. in Advancement for the Plastics Industry, Vol. 3-No. 2, Oct. 1970, and in the Stanford Research Institute Report No. 85 "Antioxidants" by L. Charmichael, May 1973.

Accordingly, the present invention provides methods and a novel class of phenolic coupling agents for modifying the interfacial boundary between chrysotile asbestos and thermoplastic resins to provide composites with hitherto unobtainable combinations of physical and thermal properties, such as improved: heat distortion temperature; stiffness and strength (both tensile and flexural); high temperature creep; resistance to thermal oxidative degradation; dimensional stability as in reduced mold shrinkage (reduced thermal coefficient of expansion); and retention of physical properties after prolonged immersion in water — especially at elevated temperatures. These improvements obtained with coupling agents which are both inexpensive and readily incorporatable into thermoplastic/chrysotile blends are illustrated in the Examples below.

The invention employs any thermoplastic polymer whose properties can be improved by the addition of asbestos filler, or whose cost can be reduced, without significant deleterious affect on properties, by the addition of the relatively inexpensive filler chrysotile asbestos. Such thermoplastic polymers include polyolefins such as high and low density polyethylene, polypropylene, ethylene-propylene copolymers, polybutene-1, polystyrene; copolymers of ethylene with one or more copolymerizable monomers such as ethyl acrylate, vinyl acetate, vinyl chloride, and acrylic acid; polyvinyl chloride and copolymers of vinyl chloride with one or more copolymerizable monomers such vinyl acetate, vinylidene chloride, maleic anhydride, and acrylonitrile; thermoplastic urethane polymers; acrylic polymers such as homopolymers and copolymers of methyl methacrylate, ethyl acrylate, and acrylonitrile; polyamides such as nylon-6 and nylon 6/6; thermoplastic polyesters; polysulfones; thermoplastic polyhydroxy ethers; and polycarbonates. Preferred thermoplastic polymers include polyolefins, especially high density polyethylene, polypropylene, and polystyrene, polyamides, and vinyl chloride polymers.

The proportions in which the thermoplastic polymer and chrysotile asbestos are employed are not critical, and can therefore vary over a wide range, e.g., from about 10 to about 50 weight per cent asbestos, and preferably from about 20 to about 40 weight per cent asbestos, the percentages being based upon the weight of the thermoplastic polymer plus asbestos. At proportions above the indicated range, the resin/asbestos mixtures tend to become too stiff, and at proportions below the range, the beneficial effects of the asbestos tend to diminish.

EXAMPLE 1

This example illustrates the methods of interfacial modification of chrysotile asbestos as used for the improvement of tensile and heat distortion properties of thermoplastic/chrysotile composites (and as illustrated with an ethylene polymer). In a cumulative manner, this and subsequent examples will also illustrate the scope of the substituted phenolics useful in the surface modification of chrysotile asbestos and the numerous improvements imparted to the resulting composites.

It is shown in Table I, below, that effective modification of the resin/asbestos interface as determined by improved mechanical properties can be achieved using various asbestos pretreatments or integral blend treatments. Three such treatments or procedures for the modification of the chrysotile surface, i.e., the resin/asbestos interface of polymer/asbestos blends, are as follows:

a. Chrysotile asbestos is hand-mixed with a solution of the additive in proportions such that all liquid is adsorbed uniformly across the surface of the asbestos. Any organic solvent in which the additive is completely soluble is suitable. Preferably, the solvent has a high vapor pressure at ambient temperature (i.e., is low boiling <100°C). Solvent is removed in vacuo at the minimum temperature required to remove all but trace amounts of solvent in approximately 12 hours evacuation. Hereafter this process will be denoted as PTO, where PT stands for pretreatment and O signifies organic solvent.

As an illustration: Eighty weight per cent resin blends were prepared from PTO chrysotile by dissolving 10 grams of 2,6-dimethylol-4-t-butylphenol in 100 cubic centimeters of acetone and hand-mixing this solution into 90 grams of asbestos. The asbestos was dried in a vacuum oven at 50°C. and 1 millimeter of mercury pressure for 12 hours. The asbestos was mechanically opened in a Waring blender, and blended into 400 grams of the resin which was prefluxed on a twin-roll mill operated at 150°C. ±10°C. for high density polyethylene (HDPE).

b. An aqueous chrysotile asbestos slurry containing approximately 50 weight per cent solids is mechanically mixed with the additive and/or an aqueous suspension or solution of same, pelletized and dried in an air circulating oven. Thus modified, the asbestos can be directly blended with the resin or mechanically opened to its original fiber liberation prior to compounding with the resin. This procedure will be denoted hereafter as PTW where PT signifies as above and W signifies water.

As an illustration: A ten pound sample of asbestos filter cake containing 50 weight per cent water was mix-mulled with 227 grams of crystalline 2,6-dimethylol-4-t-butylphenol or 252 grams of 2,6-dimethylol-4-t-butylphenol as a viscous syrup containing about 10 weight per cent water. The modified chrysotile was pelletized and dried at 105°C. in an air circulating oven for 24 hours and blended with the resin as in (a), above.

c. The interfacial additives are used for the surface modification of chrysotile asbestos in resin blends (i.e., as resin/asbestos interfacial modifiers) by integral blending the asbestos and the additive, or a suspension or solution thereof, individually into the fluxed resin or compounded with the resin in such a manner as to encapsulate the chrysotile fiber and additive. This procedure will be denoted hereafter as I.B., or integral blend.

As an illustration: Four hundred grams of HDPE were fluxed on a twin-roll mill at 150°C. To this was added 10 grams of 2,6-dimethylol-4-t-butylphenol, as crystalline material or aqueous syrup, and 90 grams of chrysotile.

Resin blends thus prepared with the aforementioned procedures were used as the molding materials. Samples for evaluation were injection molded and tested for tensile strength and modulus (ASTM-D-638-64T) and heat distortion temperature (HDT) at 264 p.s.i. (ASTM-D-648-56).

The results of the mechanicals evaluation are shown in Table I where the blends contain 2 per cent by weight additive and 78 per cent by weight HDPE A characterized by a melt index of 8 (ASTM-D-1238) and a density of 0.962 gram/cubic centimeter (ASTM-D-1505). The remainder of said blends is made up of high purity, short fiber (~ 5 $\mu$) chrysotile asbestos obtained from the Coalinga region of California.

TABLE I

| Sample No. | Additive[1] (2%) | Method of Modification | Tensile Strength (psi) | Tensile Modulus (X $10^{-3}$ psi) | HDT (°C) (264 psi) |
|---|---|---|---|---|---|
| 1 | None | None[2] | 3050 | 132 | 44 |
| 2 | t-butyl phenol resole | IB[2] | 2900 | 135 | 38 |
| 3 | None | None | 4120 | 263 | 57 |
| 4 | t-butylphenol resole | IB | 5850 | 440 | 79 |
| 5 | t-butylphenol resole | PTO | 6000 | 415 | 76 |
| 6 | DMBP | IB | 5700 | 410 | 78 |
| 7 | DMBP | PTO | 7000 | 520 | 93 |
| 8 | DMBP | PTW | 5510 | 406 | 81 |

HDPE "A"/CHRYSOTILE (78/20)

[1]=DMBP = 2,6-dimethylol-4-t-butylphenol t-butylphenol resole = medium molecular weight polymer (average m.w. about 700) from the base catalyzed reaction of t-butylphenol and formaldehyde containing terminal methylol groups and methylene ether linkages between aromatic nuclei.
[2]=No chrysotile asbestos in these samples.

It is clear from a comparison of Examples 4 through 8 with those of the control, 3, that agents of the invention are effective adhesion promoters in chrysotile-HDPE blends and improve tensile properties and heat distortion temperatures of the composites irrespective of incorporation procedure and/or method. It is further clear that these additives are acting interfacially rather than as bulk modifiers of the resin. This is illustrated in samples 1 and 2 in which it is seen that the additives impart no mechanical improvements to the resin in and of themselves, and do so only in the presence of chrysotile asbestos.

EXAMPLE 2

Samples partially illustrating the significant structural features basic to the coupling agents of the invention and presented in Tables II through IV of this Example were prepared as described in Example 1.

It has been discovered that simultaneous improvements of tensile properties and heat distortion temperature (among other properties to be discussed in further examples) of modified chrysotile filled-thermoplastic resins occurs when the phenolic coupling agent is a monomeric species ($n = 0$) which:

a. contains an organophilic group para to the phenolic hydroxyl group; and which
b. contains reactive sites or substituents ortho to the phenolic hydroxyl group, and as such is capable of advancement to higher molecular weight oligomers of the original surface modifying agent; or c. when the phenolic coupling agent is an oligomeric or polymeric medium molecular weight species ($n \geq 1$) preferably derived from p-organophilic substituted phenols. By the term "medium molecular weight" as used in these Examples, is meant average molecular weights of about 500 to about 800.

TABLE II

| Sample No. | 2% Additive (Modification) | Tensile Strength (psi) | Tensile Modulus (X $10^{-3}$ psi) | HDT (°C) (264 psi) |
|---|---|---|---|---|
| 1 | 4-t-butylphenol (PTO) | 4330 | 272 | 58 |
| 2 | 2-hydroxymethylphenol (PTO) | 5080 | 342 | 71 |
| 3 | 1,3,5-trimethylolphenol (PTO) | 4590 | 304 | 57 |
| 4 | 2-hydroxy-5-methylbenzoic acid (IB) | 4820 | 335 | 58 |
| 5 | 2-hydroxymethyl benzoate (IB) | 3910 | 252 | 54 |
| 6 | 2-hydroxy-4-t-butylphenol (IB) | 5800 | 427 | 65 |
| 7 | 2-hydroxymethyl-4-t-butylphenol (PTO) | 6520 | 466 | 85 |
| 8 | 2,6-dimethylol-4-isopropylphenol (PTO) | 5430 | 387 | 77 |
| 9 | 2,6-dimethylol-4-methylphenol (PTO) | 5480 | 342 | 71 |
| 10 | 2,6-dimethylol-4-t-butylphenol (PTO) | 7000 | 520 | 93 |

HDPE "A"/CHRYSOTILE (78/20)

Samples 1 to 6 of Table II show that for property improvement with monomeric additives the presence of neither p-organophilic (i.e., methyl or t-butyl group) nor reactive substituents ortho to the phenolic hydroxyl group (i.e., hydroxymethyl) are sufficient structural features of the interfacial agents in and of themselves. But in combination, as illustrated by examples 7 to 10, these agents show the unique increase in both tensile and heat distortion properties of the invention. See in particular samples 1, 2, 7 and 10.

The above requirements for monomeric additives from which the condition of reactivity at the ortho site has been removed in the samples of Table III are contrasted with higher molecular weight additives by comparing sample 1, an unsubstituted phenolic-novolak, with comparable p-t-butyl substituted novolaks and a p-(4-hydroxy-phenyl)-substituted novolak.

It is shown that the requirement of p-oleophilic substitution illustrated in this and in subsequent examples known to be important to the effectiveness of the low molecular weight additives ($n = 0$) is less important for the higher molecular weight novolak additives ($n \geq 1$) when no reactive materials, which could cause crosslinking of the novolak, are present.

TABLE III

| Sample No. | 2% Additive[1] (IB) | Tensile Strength (psi) | Modulus | HDT (°C.) 264 psi |
|---|---|---|---|---|
| 1 | phenol-novolak | 5250 | 370,000 | 68 |
| 2 | p-t-butylphenol-novolak (12% phenol co-condensed) | 5900 | 420,000 | 74 |

HDPE "A"/CHRYSOTILE (78/20)

TABLE III-continued

HDPE "A"/CHRYSOTILE (78/20)

| Sample No. | 2% Additive[1] (IB) | Tensile (psi) Strength | Modulus | HDT (°C.) 264 psi |
|---|---|---|---|---|
| 3 | p-t-butylphenol novalak | 6400 | 453,000 | 85 |
| 4 | Bis A-novolak[2] | 5800 | 420,000 | 73 |

[1]Novolaks prepared from phenol-formaldehyde acid catalyzed reactions yielding medium molecular weight resins with no terminal methylol groups, and having methylene linkages between aromatic nuclei.
[2]Bis A = 2,2-bis(4-hydroxyphenyl)propane
NOTE - The average molecular weights of the novolaks of Sample No. 2–4 are about 500–800.

It is further shown in Table IV as compared to the samples of Table III that the presence of reactive ortho substituents on medium molecular weight interfacial agents are acceptable structural entities, but do not significantly alter their effectiveness as defined in this example. In other words, medium molecular weight novolaks, without any further advancing means present, perform about as well as medium molecular weight resoles, which do not have the capability of further linear advancement. This is, however, contrary to the findings with monomeric species ($n = 0$), as illustrated in Table II of this example, and illustrates, as did the previous samples of Table III, the relationship between structural requirements and molecular weight on the effectiveness of these agents.

TABLE IV

HDPE "A"/CHRYSOTILE (78/20)

| Sample No. | 2% Additive[1] (PTO) | Tensile (psi) Strength | Modulus | HDT (°C.) (264 psi) |
|---|---|---|---|---|
| 1 | p-t-butylphenol - resole | 6000 | 415,000 | 76 |
| 2 | p-nonylphenol - resole | 5720 | 425,000 | 75 |
| 3 | 50% p-t-butylphenol) 50% p-phenylphenol) resole | 6000 | 437,000 | 78 |

[1]Resoles as defined in Table I, Example 1. The average molecular weights of the resoles of Sample Nos. 2 and 3 are about 700.

To further verify the relationship between ortho substitution and molecular weight on additive interfacial activity, the following solution adsorption study was carried out. One gram of chrysotile characterized by ~ 5 μ length and specific surface area of ~ 60 square meters/gram was slurried in 50 milliliters of a 0.1 percent n-heptane solution of the solute. The solutes and results of the adsorption studies are given in Table V in which the amount of solute adsorbed from solution in 72 hours was determined by optical adsorption.

TABLE V

| Sample No. | Solute | Amount of Solute Adsorbed by 1 gm Chrysotile from 50 ml of 0.1% solution |
|---|---|---|
| 1 |  (R = t-butyl) | 45% |
| 2 | 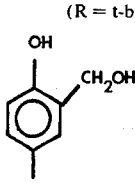 | 75% |

TABLE V-continued

| Sample No. | Solute | Amount of Solute Adsorbed by 1 gm Chrysotile from 50 ml of 0.1% solution |
|---|---|---|
| | (R = t-butyl) | |
| 3 | p-t-butylphenol - resole* | 85–90% |
| 4 | p-t-butylphenol-novolak* | 85% |

*As described in Tables I and III

The concentration of solute remaining in solution after removing the adsorbent was determined assuming Beer's Law and measuring the absorbance of the filtrate versus a standardized test solution for each solute. The wavelengths of the doubled bands which were measured using a Cary 14 U.V. spectrophotometer were:

| p-t-butylphenol | 2,790 A |
| 2-hydroxymethyl-4-t-butylphenol | 2,830 A |
| p-t-butylphenol - resole | 2,750 A |
| p-t-butylphenol - novolak | 2,800 A |

From the results listed in Table V, it is clear that an ortho methylol group, which is representative of a broad class of nucleophilic groups capable of interacting with the chrysotile surface as will be shown below, enhances the adsorption of p-alkylphenols onto chrysotile. This effect is particularly true in the special case of the generalized embodiment where $(n) = 0$ and the additive is monomeric where $R_1 \neq R_2$ and $R_2 = $ hydrogen. It is also clear that apart from statistical and solubility factors, the case of the generalized embodiment where $n \geq 1$ and $R_1$ may $= R_2 = $ hydrogen is clearly illustrated in this example. When the additives are of sufficient complexity ($n \neq 0$) other interactions in addition to those described above play an important role. Such interactions are indicated in the FIGURE and depict various potential additive/chrysotile interactions. It is apparent neither structural type is preferred in the solution adsorption test.

Without wishing to be bound by any theory or mechanism, it is presently believed that the FIGURE represents a generalized partial description of those interactions occurring at the additive/chrysotile interface as discussed herein and which are also expected to occur with nucleophilic bridging groups (X) as discussed in Example 3.

It is believed, therefore, that the advantages claimed within the scope of this invention are in part directly attributable to the presence of reactive nucleophilic groups ($R_1$ and $R_2$) ortho to the phenolic hydroxyl which in addition to the phenolic hydroxyl group can enter into a bonding interaction with the Brucite surface layer of chrysotile asbestos. This interaction can be described as involving co-ordinate (dative), covalent, and electrostatic (van der Waals) bonding, and all combinations thereof. Consequently, unreactive groups in this context and unreactive sterically hindering groups ortho to the phenolic hydroxyl group such as methyl, and t-butyl reduce the effectiveness of the interfacial additives in proportion to their complexity. This latter point is clearly illustrated in the samples of Table VI, which were prepared as were those in Tables I through IV.

interfacial agents, as illustrated in Table VII. In dimeric species which have been evaluated as interfacial adhesion promoters in HDPE/Chrysotile blends, additives with ortho methylene bridging groups yield composite properties far superior to those with para methylene bridging groups. This is particularly evident in the case of the p-alkyl substituted phenolic nuclei (samples 3 and 4) where polymer-fiber interaction is enhanced owing to the presence of the oleophilic p-methyl group. In these latter samples the magnitude of the effects of interfacial modification are maximized. According to the model presented in the FIGURE, the ortho bridged species is capable of aligning its phenolic hydroxyls on the surface of the chrysotile fiber such that the maximum number of strain-free configurations for bonding with that surface as described in Example 2 can occur. The exact nature of the phenolic hydroxyl-Brucite interaction is not clearly understood at this time, but it is certain that the increased acidity of the phenolic hydroxyl in ortho methylene substituted phenolic species is an important factor.

TABLE VII

| | HDPE "A"/CHRYSOTILE (78/20) | | | |
|---|---|---|---|---|
| Sample[1] No. | Additive 2% (I.B.) | Tensile (psi) Strength | Modulus | HDT (°C.) (264 psi) |
| 1 | Bis(2-hydroxyphenyl)methane | 5100 | 332,000 | 60 |
| 2 | Bis(4-hydroxyphenyl)methane | 4420 | 286,000 | 61 |
| 3 | Bis(2-hydroxy-3,5-dimethylphenyl)methane | 5510 | 375,000 | 72 |
| 4 | Bis(4-hydroxy-3,5-dimethylphenyl)methane | 4900 | 325,000 | 61 |

[1]Prepared from materials and with procedures described in Example 1.

In the absence of increased hydroxyl acidity, it is clearly evident from the methylene ether bridged resole samples of Table IV and as depicted in the FIGURE that nucleophilic groups at least two atomic nuclei distant from the ortho carbon atom in phenolic agents are advantageous. This is clearly shown in Table VIII where, in addition to alcoholic and ether oxygen atoms, amine nitrogen atoms are also shown to be effective in this context.

TABLE VI

| | HDPE "A"/CHRYSOTILE (78/20) | | | |
|---|---|---|---|---|
| Sample No. | Additive 2% (IB) | Tensile (psi) Strength | Modulus | HDT (°C.) (264 psi) |
| 1 | 2,6-dimethylol-4-t-butylphenol | 5700 | 410,000 | 78 |
| 2 | Bis(2-hydroxy-3,5 dimethylphenyl)-methane | 5510 | 375,000 | 72 |
| 3 | Bis(2-hydroxy-3-t-butyl-5-methyl-phenyl)methane | 5090 | 343,000 | 63 |
| 4 | None | 4120 | 263,000 | 57 |

EXAMPLE 3

It has been discovered that composition and position of the bridging group (X) of the generalized embodiment are important factors in the performance of the

TABLE VIII

| | HDPE "A"/CHRYSOTILE (78/20) | | | |
|---|---|---|---|---|
| Sample No. | Additive 2% I.B. | Tensile (psi) Strength | Modulus | HDT (°C.) (264 psi) |
| 1 | hexamethylene tetramine (hexa) | 4480 | 300,000 | 56 |
| 2 | p-t-butylphenol | 4330 | 272,000 | 58 |
| 3 | p-t-butylphenol/hexa (5/1)[1] | 5500 | 400,000 | 79 |
| 4 | p-t-butylphenol-resole[2] | 5850 | 440,000 | 79 |
| 5 | 2,6-dimethylol-4-t-butylphenol | 5700 | 410,000 | 78 |

[1]Medium molecular weight (average m.w. about 5–800) resin containing ≥ 90% —$CH_2$—N—$CH_2$, alkyl amine, linkages as established by NMR analysis.

[2]Resole as described in Table I.

EXAMPLE 4

This example illustrates the enhancement of mechanical properties of I.B. HDPE composites prepared from various mixtures of additives and shows the effect of varying the concentration of p-alkyl substitution on these values.

The chrysotile asbestos used in the samples shown in Table IX is a more highly liberated form of the same basic chrysotile used in all previous examples and originates from the same Coalinga California source.

Additive mixtures were intimately mixed with mortar and pestle prior to their integral blend addition to the fluxed resin as described in Example 1.

Nuclear magnetic resonance spectra of similar additive blends heated under conditions similar to those incurred during compounding show that for all variations of concentrations, the additives advance to higher molecular weight oligomers containing approximately 4.5/1 bridging dimethylene ether groups per terminal methylol group. Less than 2 percent of the bridging groups in any case were methylene. In this Example, 2-hydroxymethylphenol is employed, either by itself or in combination with 2,6-dihydroxymethyl-t-butylphenol. Under the conditions employed in making the HDPE/chrysotile blends (150° ± 10°C., no catalyst), the condensation of one methylol group with another to form a methylene ether bridging group occurs at a far greater rate than the reaction of methylol with hydrogen at the ortho or para positions. (Evidence supporting this is that less than 2 per cent of the bridging groups were methylene.) Therefore, even though 2-hydroxymethylphenol has an unsubstituted para position, no significant amount of cross-linking occurred with the experiments whose results are presented below in Table IX.

TABLE IX

HDPE "A"/ADDITIVE/CHRYSOTILE (80/2/18 wt. %)

| Sample No. | Additive Ratio[1] (mole %) | Tensile (psi) Strength | Mod ×10$^{-3}$ | HDT (°C.) (264 psi) |
|---|---|---|---|---|
| 1 | 0 /1-DMBP | 7030 | 539 | 93 |
| 2 | 1-MP /1-DMBP | 6050 | 465 | 86 |
| 3 | 1-MBP/1-DMBP | 6560 | 521 | 97 |
| 4 | 2-MP /1-DMBP | 6280 | 492 | 93 |
| 5 | 2-MBP/1-DMBP | 6610 | 511 | 97 |
| 6 | 1-MP / 0 | 5480 | 402 | 76 |
| 7 | 1-MBP/ 0 | 6120 | 479 | 91 |

[1]DMBP = 2,6-dimethylol-4-t-butylphenol
MP = 2-hydroxymethylphenol
MBP = 2-hydroxymethyl-4-t-butylphenol From the samples shown in Table IX it is illustrated as in previous examples that the presence of p-oleophilic groups and o-nucleophilic groups in the phenolic agents contributes to the improvements in tensile and HDT properties of HDPE/chrysotile blends. It is further shown that mixtures of p-oleophilic and non-para-substituted ortho nucleophilic substituted phenols are effective agents within the scope of this invention.

EXAMPLE 5

This example will show that the surface modification of chrysotile asbestos allows for the stabilization of polypropylene (PP) composites from accelerated oxidative decomposition with customary amounts of primary "hindered phenol" antioxidants. This advantage of the invention is exemplified by the samples in Table X.

TABLE X

| Sample No. | PP/Additives[1]/ Chrysotile (wt. %) | DSC at 230°C.[2] (min) | Oven Aging at 150°C.[2] (hrs.) |
|---|---|---|---|
| 1 | 100 / 0    / 0 | 4.6 | ~1200 |
| 2 | 98 / 2-DMBP  / 0 | 18.4 | — |
| 3 | 80 /.  0    /18 | 3.8 | 70 |
| 4 | 80 / 2-DMBP  /18 | 20.2 | 140 |
| 5 | ~80 / 0.8 - IR /18 | 12.7 | 144 |
| 6 | ~80 /0.4-IR + 2-DMBP /18 | 45.6 | 240 |
| 7 | ~80 /0.8-IR + 2-DMBP /18 | 70.3 | 480 |
| 8 | ~80/1.18-IR + 2-DMBP /18 | 93.4 | 750 |

[1] IR = Pentaerythrityltetra-(4-hydroxy-3,5 di-t-butyl phenyl-propionate) [commercial antioxidant with trade name "Irganox 1010] DMBP = 2,6-dimethylol-4-t-butylphenol
[2] The significance of the two tests used to evaluate these samples is explained below.

Samples illustrated in Table X were prepared from polypropylene supplied by Shell Chemical Co. and characterized by melt flow 5 dg/min and specific gravity 0.916 (ASTM-D792-64). The samples were compounded on a twin-roll mill at 180°C. The antioxidant and surface modified chrysotile after blending were granulated and ram injection molded into test specimens with dimensions ⅛ inch × ½ inch × 6 inch.

Thermal testing was accomplished using two separate techniques. The first denoted as DSC involves the use of a differential scanning calorimeter, Perkin Elmer Model 1B, in which a ~ 10 mil film of the blend is preheated in a $N_2$ atmosphere and the time from the admission of air to the sample chamber until the onset of the exothermic oxidation reaction occurs is measured. This time interval is called the oxidative induction time. The oven aging test is carried out in an air circulating oven at a constant temperature. The time to thermal degradation of the sample as measured by the observed abrupt decrease in flexure strength is measured.

It is clear from the table above that the interfacial agent, DMBP, obtains some antioxidant properties in polypropylene resins at elevated temperatures in and of itself and when utilized as an interfacial agent to modify the surface of chrysotile asbestos. More particularly, DMBP as a pretreatment for chrysotile asbestos acts synergistically with primary "hindered phenol" antioxidants which in themselves are mostly ineffective at low concentrations in chrysotile-polypropylene blends. It is further discovered that this synergism obtains with integral blend addition of antioxidant and interfacial agent as described in Example 1.

It is believed that the synergistic effect noted above results from the inhibition of "Irganox 1010" adsorption onto the chrysotile fiber surface, and as such prevents the large reduction in antioxidant effectiveness seen in the control sample No. 5 in comparison to sample No. 7. Moreover, it is believed that the additives of the invention are not acting predominately as free radical inhibitors in these systems, but as deactivators of the reactive sites and/or impurities present in the chrysotile mineral as commonly found in nature.

composites) are ineffective as surface modifiers in the object of the example.

Pretreatment of chrysotile with DMBP improves the thermal stability of asbestos/polypropylene blends by approximately 300 per cent over other other additives common in current practice.

EXAMPLE 7

This example shows, in the manner of Example 6, that interfacial additives of this invention in comparison to others well known in the state of the art impart enhanced tensile properties, heat distortion properties and a unique resistance of these properties to degradation in hot aqueous environments.

Table XII illustrates with the sample described in Table XI, above, the improvement of mechanical properties and the resistance to deterioration of these properties in boiling water for 7 days shown by interfacial additives of this invention.

TABLE XII

| Sample No. | Resin/Additive/Chrysotile (wt. %) | | $H_2O$ Temp. 100°C.* (days) | Tensile Strength (psi) Before | After | Tensile Mod. ×$10^{-3}$ (psi) Before | After | HDT (°C) (264 psi) Before | After |
|---|---|---|---|---|---|---|---|---|---|
| 1 | PP-70.4/ | 0 /29.6 | 7 | 4160 | 4010 | 299 | 258 | 62 | 58 |
| 2 | PP-70 / | 2.1 DPE /27.9 | 7 | 4970 | 4140 | 393 | 295 | 66 | 63 |
| 3 | PP-70 / | 2.1[DPE/TMA(1/1)] /27.9 | 7 | 5180 | 3320 | 412 | 194 | 77 | 47 |
| 4 | PP-70 / | 2.1[RS/hexa (1/0.64)] /27.9 | 7 | 5180 | 4540 | 356 | 317 | 69 | 64 |
| 5 | PP-70 / | 2.1 DMBP /27.9 | 7 | 6310 | 6600 | 507 | 545 | 95 | 106 |

*Samples totally immersed in refluxing distilled water (pH 6)

EXAMPLE 6

This example illustrates the advantages of surface modified chrysotile in the manner described in Example 1 with regard to enhanced thermal stability of polypropylene blends in comparison to other interfacial additives well known in the state of the art.

Table XI shows the effect of PTO additive blends in the polypropylene of Example 5 on the DSC and oven aging thermal oxidative induction times also described in that example.

It is believed that the unique improvement in tensile and heat distortion properties exhibited by use of the additives as shown by sample No. 5 after aging in boiling water for 7 days has never before been witnessed in systems of this nature. The improvements obtained with the coupling agents therefore substantially enhance the usefulness of polymer/chrysotile blends as they are utilized in articles which must retain their original properties in humid environments at elevated temperatures.

TABLE XI

| Sample No. | Resin/Additive/Chrysotile (wt. %) | | DSC at 230°C. (min) | Oven Aging at 150°C. (hrs.) |
|---|---|---|---|---|
| 1 | 100 / | 0 0 | 4.6 | ≈1200 |
| 2 | 70.4/ | 0 /29.6 | 2.8 | < 100 |
| 3 | 70 / | 2.1 DPE /27.9 | 2.6 | < 100 |
| 4 | 70 / | 2.1[DPE/TMA (1/1)] /27.9 | 2.4 | < 100 |
| 5 | 70 / | 2.1[RS/hexa (1/0.64)] /27.9 | 2.8 | < 100 |
| 6 | 70 / | 2.1 DMBP /27.9 | 24.0 | ≈ 300 |

Additives:
DPE = dipentaerythritol;
TMA = trimellitic anhydride;
RS = resorcinol;
DMSP = 2,6-dimethylol-4-t-butylphenol It is clearly shown that interfacial additives such as dipentaerythritol-trimellitic anhydride and resorcinol-hexa blends, which are known to co-react and form high molecular weight species at 180°C. (the temperatures required to compound polypropylene-chrysotile composites) are ineffective...

To illustrate the above improvements are not unique to composites prepared from polypropylene resins. Table XIII illustrates similar results using 2,6-dimethylol-4-t-butylphenol (DMBP) pretreated (PTO) chrysotile in the HDPE matrix previously described in Example 1.

TABLE XIII

| Sample No. | Resin/Additive/Chrysotile (wt. %) | $H_2O$ Temp. 100°C. (days) | Tensile Strength (psi) Before | After | Tensile Mod × $10^{-3}$ (psi) Before | After | HDT (°C.) Before | After |
|---|---|---|---|---|---|---|---|---|
| 1 | HDPE-81.6/ 0 /18.4 | 2 | 3990 | 3730 | 264 | 215 | 58 | 45 |
| 2 | HDPE-80 /2-DMBP/18 | 2 | 5510 | 5560 | 406 | 426 | 81 | 99 |
| 3 | HDPE-70 /3-DMBP/27 | 2 | 6540 | 6860 | 536 | 589 | 96 | 110 |

It can be reasonably expected that these effects will also be found in any hydrolytically stable thermoplastic resin filled with chrysotile asbestos modified with the additives of this invention.

DMBP and the t-butylphenol-resole (BP - resole) defined in Table I.

TABLE XIV

HDPE "A"/CHRYSOTILE (80/18)

| Sample No. | Additive wt. % (Method) | Tensile (psi) Strength | Mod × 10⁻³ | HDT °C. (264 psi) | Flexure (psi) Strength | Mod × 10⁻³ |
| --- | --- | --- | --- | --- | --- | --- |
| 1 | — | 4100 | 250 | 55 | 6800 | 388 |
| 2 | 2 -BP-resole (IB) | 5900 | 420 | 77 | 9600 | 560 |
| 3 | 1,4-DMBP (PTW) | 5520 | 407 | 79 | 8210 | 477 |
| 4 | 2 -DMBP (PTO) | 7000 | 520 | 93 | 11,900 | 715 |

Similar results have been obtained in polystyrene (PS) (specific gravity 1.05 supplied in Union Carbide Corp. with identifying code SMD-3500) composites as shown in Table XV.

TABLE XV

PS/CHRYSOTILE (80/18)

| Sample No. | Additive* wt. % (Method) | Tensile (psi) Strength | Mod × 10⁻³ | HDT °C. (264 psi) | Flexure (psi) Strength | Mod × 10⁻³ |
| --- | --- | --- | --- | --- | --- | --- |
| 1 | — | 6860 | 802 | 89 | 9,740 | 905 |
| 2 | 2-BP-resole (IB) | 8800 | 1200 | 95 | 13,600 | 1080 |
| 3 | 2-DMip (PTO) | 9230 | 943 | 95 | 12,800 | 1074 |
| 4 | 2-DMBP (PTO) | 8950 | 1003 | 97 | 12,300 | 1110 |

*Additive DMip = 2,6-dimethylol-4-isopropylphenol; other additives as described above.

EXAMPLE 8

The use of interfacial additives for the improvement of stiffness and strength (both tensile and flexural) of chrysotile/polymer composites is exemplified in various thermoplastic resins. The property enhancements discovered are shown to be comparable for all the various incorporation procedures described in Example 1.

All samples shown in Tables XIV through XVII were ram injection molded under optimum conditions into standard ASTM molded bars and were tested using standard ASTM methods: D-638-64T, D-648-56 and D-790-66.

Table XIV illustrates the improvements found in HDPE (MI = 8, density = 0.962) composites for chrysotile asbestos treated as described in Example 1 with Consistent mechanical property improvement is also seen in polypropylene matrices irrespective of surface modification procedure. Table XVI illustrates those samples prepared from polypropylene described in previous examples.

TABLE XVI

80-PP/0.8 "IRGANOX 1010"/18-CHRYSOTILE

| Sample No. | Additive wt. % (Method) | Tensile (psi) Strength | Mod ×10⁻³ | HDT (°C.) (264 psi) | Flexure (psi) Strength | Mod × 10⁻³ |
| --- | --- | --- | --- | --- | --- | --- |
| 1 | — | 4880 | 298 | 68 | 9,530 | 429 |
| 2 | 2-DMip (IB) | 6240 | 447 | 101 | 11,200 | 674 |
| 3 | 2-DMBP (IB) | 6280 | 439 | 99 | 11,800 | 697 |
| 4 | 2-DMBP (PTO) | 6740 | 476 | 97 | 11,500 | 693 |
| 5 | 2-DMBP (PTW) | 6220 | 431 | 112 | 11,900 | 673 |

In addition to the enhancement of tensile and flexural properties of polyvinyl chloride (PVC) matrices, additives of the invention (due to their effective modification of the chrysotile surface in the manner described in Example 5) allow chrysotile reinforcement with conventional levels of PVC stabilizers. In testimony to this improvement, an unmodified chrysotile control sample could not be prepared as with previous resins of the example.

TABLE XVII

| Sample No. | Wt. % Composition (Method) | Tensile (psi) Strength | Mod × 10⁻³ | HDT °C. (264 psi) | Flexure (psi) Strength | Mod × 10⁻³ |
| --- | --- | --- | --- | --- | --- | --- |
| 1 | 100-PVC⁽¹⁾ | 6800 | 390 | 77 | 12,400 | 413 |
| 2 | 84.7 PVC /2.3 BP-resole/ 15.3 Chrysotile (I.B.) | 8300 | 530 | 77 | 15,200 | 690 |

⁽¹⁾Formulation (pph): QSAN-7 (100) - Union Carbide resin inherent viscosity 1.00 ASTM D-1243; Advastab TM 181 (1.6); Calcium Stearate (1.5); Acryloid K120N (2); Wax XL165 (1); TiO₂(2).

EXAMPLE 9

In the injection molded samples used in the evaluation of mechanical properties in the above examples, we have observed that the coupling agents, in addition to enhancing strength, modulus, and HDT of polymer/chrysotile blends, also are effective in reducing mold shrinkage of injection molded parts, especially parallel to the flow direction. Data on composite blends as a function of additive concentration appear in Table XVIII. The chrysotile and HDPE resin are that of Example 1. Samples were injection molded on a VanDorn ram molding machine under the following conditions: mold (125°F.), barrel (400°F.), pressure (800 psi), cycle time (30 sec.).

Corp. and known as "Calidria RG 144" and a long fiber grade from Canada supplied by Johns-Manville Corp. with the trade name "Plastibest No. 20." Anthophyllite asbestos of general composition $Mg_7Si_8O_{22}(OH)_2$ and denoted C-3 in Table XIX were obtained from the asbestos Corporation of America under the trade name "Aplex 101." The Crocidolite asbestos of general composition $Na_2Fe_3Fe_2Si_8O_{22}(OH)_2$ and variously known as "blue" asbestos was obtained from the Special Asbestos Company Inc. identified as MS6 and is denoted as C-4 in Table XIX. Due to the high crystallographic metal content in blue asbestos, a finite concentration of basic groups is expected to be present on the mineral surface.

It is seen that the coupling agents of the invention are

TABLE XIX

| Sample No. | Asbestos (wt. %) | Additive[1] (wt. %) | Resin | Tensile (psi) Strength | Mod × $10^{-3}$ | HDT °C. (264 psi) | Flexure (psi) Strength | Mod × $10^{-3}$ |
|---|---|---|---|---|---|---|---|---|
| 1 | 18% C-3 | 0 | PP | 4540 | 294 | 64 | 8,870 | 416 |
| 2 | " | 2% B | " | 4540 | 306 | 63 | 9,080 | 394 |
| 3 | 18% C-1 | 0 | " | 4880 | 298 | 68 | 9,530 | 429 |
| 4 | " | 2% B | " | 6080 | 417 | 94 | 11,300 | 570 |
| 5 | 18% C-2 | 0 | " | 5230 | 325 | 75 | 9,060 | 469 |
| 6 | " | 2% B | " | 7120 | 478 | 119 | 12,200 | 634 |
| 7 | 15% C-1 | 0 | HDPE | 3580 | 207 | 52 | — | — |
| 8 | " | 1.5% A | " | 4850 | 316 | 67 | — | — |
| 9 | 15% C-2 | 0 | " | 4180 | 285 | 67 | 6,900 | 400 |
| 10 | " | 1.5% A | " | 5910 | 379 | 84 | 9,600 | 450 |
| 11 | 30% C-1 | 0 | " | 4140 | 282 | — | — | — |
| 12 | " | 3% A | " | 6570 | 508 | — | — | — |
| 13 | 30% C-2 | 0 | " | 5660 | 431 | 97 | 9,580 | 638 |
| 14 | " | 3% A | " | 7460 | 609 | 102 | 12,500 | 836 |
| 15 | 20% C-4 | 0 | " | 5620 | 416 | 81 | — | — |
| 16 | " | 2% A | " | 6370 | 438 | 79 | — | — |

[1]A = 4-t-butylphenol -resole; B = 2,6-dimethylol-4-t-butylphenol

TABLE XVIII

| Sample No. | Wt. % 2,6-dimethylol-4-t-butylphenol | Mold Shrinkage (%) |
|---|---|---|
| 1 | 0 | 1.6 |
| 2 | 0.4 | 1.3 |
| 3 | 1.0 | 0.8 |
| 4 | 2.0 | 0.3 |
| 5 | 3.0 | 0.2 |

The observed reduction in mold shrinkage is a significant improvement allowing closer tolerances in mold design when fabricating with chrysotile reinforced resin.

EXAMPLE 10

The effect of these phenolic coupling agents as adhesion promoters for chrysotile asbestos in comparison with other types of asbestos is shown in Table XIX.

Evaluations of adhesion promotion as measured by increased stiffness, strength and heat distortion temperature of injection molded PP and HDPE/asbestos composites appear in Table XIX. Chrysotile asbestos fibers of general composition $Mg_3Si_2O_5(OH)_4$ and denoted C-1 and C-2 are respectively a highly liberated short fiber ($\sim 5\,\mu$) grade obtained from the Union Carbide effective adhesion promoters for chrysotile asbestos, completely ineffective for anthophyllite and somewhat effective for crocidolite. The uniqueness of the coupling agent-chrysotile interaction within the larger classification of asbestos minerals has been thus established.

As used in the claims which follow, the term "elevated temperature" refers to the temperature reached during processing of chrysotile-reinforced thermoplastic compositions. The specific elevated temperatures employed in individual cases will depend upon the nature of the thermoplastic polymer. Such temperatures are known to those skilled in the art of thermoplastic polymer processing.

What is claimed is:

1. A composition comprising a thermoplastic polymer reinforced with chrysotile asbestos filler, which composition contains sufficient first phenolic composition at the interface of said filler and said thermoplastic polymer to increase the tensile strength of an article molded from said reinforced polymer, wherein said first phenolic composition is obtained by heating a second phenolic composition which is a member selected from the group consisting of:
   a. a first phenol having at least one orthohydroxymethyl group;

b. a resole derived from a phenol having an oleophilic substituent in the para position;

c. a first novolak having the methylene bridges between phenolic nuclei at least predominantly bonded to the positions ortho to the phenolic hydroxyls;

d. a second novolak derived from a phenol having an oleophilic substituent in the para position, said second novolak being employed in combination with a reactive material capable of reacting with said second novolak at elevated temperature to effect linear advancement thereof;

e. a second phenol having at least one unsubstituted position ortho to the phenolic hydroxyl, or having at least one reactive substituent group ortho to the phenolic hydroxyl, and having an oleophilic substituent in the para position, said second phenol being employed in combination with a reactive material capable of reacting with said second phenol at elevated temperature to effect linear advancement thereof.

2. A composition comprising a thermoplastic polymer reinforced with chrysotile asbestos filler, which composition contains sufficient first phenolic composition at the interface of said filler and said thermoplastic polymer to increase the tensile strength of an article molded from said reinforced polymer, wherein said first phenolic composition is obtained by heating a second phenolic composition, said second phenolic composition being a composition of the formula:

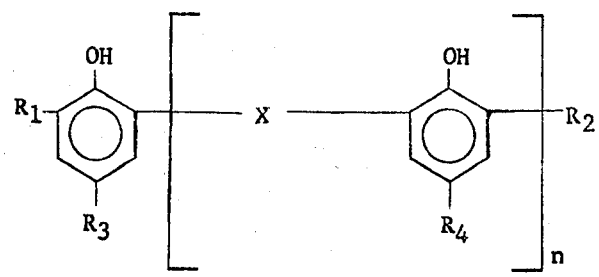

wherein $n$ represents a number having an average value within the range of from zero to ten; wherein, when $n$ is zero, $R_1$ is hydrogen, hydroxymethyl, aminomethyl, N-methylaminomethyl, carbonyloxyalkyl, carbonyloxyaryl, or alkyl, $R_1$ is as defined for $R_1$, and $R_3$ is an oleophilic substituent, provided that when $n$ is zero, said second phenolic composition is capable of linear advancement when subjected to elevated temperature; and wherein when $n$ is greater than zero, $R_1$ and $R_2$ are as defined above, $R_3$ is hydrogen or an oleophilic substituent, $R_4$ is hydrogen or an oleophilic substituent, and X is a divalent bridging group connecting phenolic nuclei, provided that when at least one of $R_3$ and $R_4$ is hydrogen, said second phenolic composition is employed in the absence of a material that can effect significant amounts of cross-linking of said second phenolic composition when said second phenolic composition is subjected to elevated temperature.

3. The composition of claim 2 wherein each oleophilic substituent individually is alkyl, aryl, alkaryl, aralkyl, alkenyl, cycloalkyl, cycloalkenyl, any of the foregoing substituted with halo, halo, trifluoromethyl, carbonyloxyalkyl, carbonyloxyaryl, hydroxyarylalkyl, hydroxyarylthio, or hydroxyarylsulfone.

4. The composition of claim 3 wherein X is methylene, methyleneoxymethylene, methyleneaminomethylene, methyleneureylenemethylene, methylenethioureylenemethylene, methylenethiomethylene, or methylenesulfonylmethylene.

5. The composition of claim 2 wherein $n$ is zero, wherein $R_1$ is hydroxymethyl, wherein $R_2$ is hydroxymethyl or hydrogen, and wherein $R_3$ is alkyl, aryl, aralkyl, or alkaryl.

6. The composition of claim 2 wherein $n$ is greater than zero, wherein each $R_1$ and $R_2$ individually is hydrogen or hydroxymethyl, wherein each $R_3$ and $R_4$ individually is alkyl, aryl, aralkyl, alkaryl, or hydroxyaralkyl, and wherein X is methylene, methyleneoxymethylene, or methyleneaminomethylene.

7. The composition of claim 5 wherein the second phenolic composition is a para-alkyl-ortho-hydroxymethylphenol.

8. The composition of claim 6 wherein the second phenolic composition is a novolak derived from a para-alkylphenol.

9. The composition of claim 6 wherein the second phenolic composition is a resole derived from a para-alkylphenol.

10. The composition of claim 2 wherein said second phenolic composition consists essentially of para-alkylphenol or a novolak derived from para-alkylphenol, and hexamethylenetetramine.

11. The composition of claim 1 wherein the thermoplastic polymer is a polyolefin, polystyrene, a vinyl chloride polymer, a polyamide, a urethane polymer, an acrylic polymer, a polyester, a polysulfone, a polyhydroxyether, or a polycarbonate.

12. The composition of claim 1 wherein the thermoplastic polymer is high density polyethylene, polypropylene, polystyrene, polyvinyl chloride, or a polyamide.

13. The composition of claim 11 wherein the thermoplastic polymer is polypropylene and said first phenolic composition is employed in combination with conventional antioxidants as an interfacial additive to reduce the oxidative instability of polypropylene/chrysotile blends.

14. The composition of claim 11 wherein said thermoplastic polymer is polyvinyl chloride.

15. The composition of claim 11 wherein said thermoplastic polymer is high density polyethylene.

16. A composition comprising chrysotile asbestos intimately mixed with the second phenolic composition as defined in claim 2, said second phenolic composition being employed in an amount of at least 1 weight per cent, based on weight of said asbestos, whereby said asbestos has enhanced utility as a reinforcing filler for thermoplastic polymers.

17. The composition of claim 16 wherein the second phenolic composition is employed in an amount of at least about 8 weight per cent, based on weight of said chrysotile asbestos.

* * * * *

UNITED STATES PATENT OFFICE
CERTIFICATE OF CORRECTION

Patent No. 3,928,278         Dated December 23, 1975

Inventor(s) Raymond George Azrak et al.

It is certified that error appears in the above-identified patent and that said Letters Patent are hereby corrected as shown below:

Summary sheet, "Balger" should read -- Bolger --.

Column 1, line 9, "insert" should read -- inert --.

Column 1, line 10, quotation marks should appear after the word "reinforcing".

Column 1, line 68, "from" second occurrence, read -- form --.

Column 3, line 12, "11-16" should read -- 1-16 --.

Column 4, line 63, a new paragraph should begin with the word "Specific".

Column 5, line 20, "(CH$_2$NH$_2$,)" should read -- (-CH$_2$NH$_2$), --.

Column 6, line 3, "methyleneaminnomethylene should read -- methyleneaminomethylene --.

Column 6, line 14, "aldehydeengendering" should read -- aldehyde-engendering --.

Column 6, line 15, "para-substituted -2,6dihy-" should read -- para-substituted -2,6-dihy- --.

Column 6, line 48, "2,2bis(2-hydroxy-5-methylphenyl)-propane " should read -- 2,2-bis(2-hydroxy-5-methylphenyl)-propane --.

UNITED STATES PATENT OFFICE
CERTIFICATE OF CORRECTION

Patent No. 3,928,278  Dated December 23, 1975

Inventor(s) Raymond George Azrak et al.

It is certified that error appears in the above-identified patent and that said Letters Patent are hereby corrected as shown below:

Column 6, line 54, "para-misopropylphenol" should read -- para-isopropylphenol --.

Column 7, line 55, "asbesots" should read -- asbestos --.

Column 10, line 63, quotation marks should appear about the letter "A".

Column 11, Table I, "(X $10^{-3}$ psi)" should read -- (X $10^3$ psi) --.

Column 12, Table II, "HOPE" should read -- HDPE --.

Column 12, Table II, "(X $10^{-3}$ psi)" should read -- (X $10^3$ psi) --.

Column 13, line 22, "not" should be deleted.

Column 17, Table IX, "$10^{-3}$" should read -- $10^3$ --.

Column 18, footnote (1) of Table X, "Pentaerythrityl-tetra-(4-hydroxy-3,5 di-t-butyl phenyl-propionate)" should read -- Pentaerythrityltetra-(4-hydroxy-3,5-di-t-butyl phenyl-propionate) --.

Column 20, Table XII, "$10^{-3}$" should read -- $10^3$ --.

UNITED STATES PATENT OFFICE
CERTIFICATE OF CORRECTION

Patent No. 3,928,278　　　　　Dated December 23, 1975

Inventor(s) Raymond George Azrak et al.

It is certified that error appears in the above-identified patent and that said Letters Patent are hereby corrected as shown below:

Column 20, lines 34-35, "boild-ing" should read -- boil-ing --.

Column 20, line 57, the period (.) after "resins" should be a comma (,).

Column 20, Table XIII, "$10^{-3}$" should read -- $10^3$ --.

Column 22, line 15, "in" should read -- by --.

Column 24, line 6, "asbestos" should read -- Asbestos --.

Column 24, Table XIX, "$10^{-3}$" should read -- $10^3$ --.

Column 24, line 65, "orthohydrox" should read -- ortho-hydrox- --.

UNITED STATES PATENT OFFICE
CERTIFICATE OF CORRECTION

Patent No. 3,928,278  Dated December 23, 1975

Inventor(s) Raymond George Azrak et al.

It is certified that error appears in the above-identified patent and that said Letters Patent are hereby corrected as shown below:

Column 25, line 48, "$R_1$", (first occurrence) should read -- $R_2$ --.

Column 26, line 2, "halo," (second occurrence) should be deleted.

Signed and Sealed this

Seventeenth Day of April 1979

[SEAL]

Attest:

RUTH C. MASON
Attesting Officer

DONALD W. BANNER
Commissioner of Patents and Trademarks